(12) United States Patent
Lai

(10) Patent No.: US 7,431,408 B2
(45) Date of Patent: Oct. 7, 2008

(54) MOVABLE COVER-PLATE OF A COMPUTER HOST

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 419 days.

(21) Appl. No.: 11/377,704

(22) Filed: Mar. 15, 2006

(65) Prior Publication Data

US 2007/0215756 A1 Sep. 20, 2007

(51) Int. Cl.
*A47B 81/00* (2006.01)
*A47B 97/00* (2006.01)

(52) U.S. Cl. .................................... 312/223.1; 361/683

(58) Field of Classification Search ................ 248/682; 312/319.1, 319.2, 223.2, 327, 328; 361/683, 361/686, 687, 724–727; D14/349, 440, 444
See application file for complete search history.

(56) References Cited

U.S. PATENT DOCUMENTS

| 4,986,618 | A | * | 1/1991 | Wakatsuki | 312/276 |
| 5,599,470 | A | * | 2/1997 | Peotter et al. | 219/133 |
| 5,676,718 | A | * | 10/1997 | Davison et al. | 55/385.6 |
| 5,924,782 | A | * | 7/1999 | Park | 312/328 |
| 5,926,916 | A | * | 7/1999 | Lee et al. | 16/230 |
| 6,437,976 | B1 | * | 8/2002 | Wolff et al. | 361/683 |
| 6,535,379 | B1 | * | 3/2003 | Smeenge et al. | 361/683 |
| 6,590,765 | B2 | * | 7/2003 | Crowley | 361/683 |
| 6,595,605 | B1 | * | 7/2003 | Babcock et al. | 312/223.2 |
| D494,170 | S | * | 8/2004 | Lai | D14/349 |
| 6,954,354 | B2 | * | 10/2005 | Shyr | 361/683 |

* cited by examiner

*Primary Examiner*—Gwendolyn Baxter
(74) *Attorney, Agent, or Firm*—Pro-Techtor Int'l Services

(57) ABSTRACT

A movable cover-plate of a computer host is installed on a front panel of the computer host to cover a slot of hard disk driver and a slot of CD-ROM disk driver of the front panel in normal times, and to be opened by being pressed down, when being used.

1 Claim, 5 Drawing Sheets

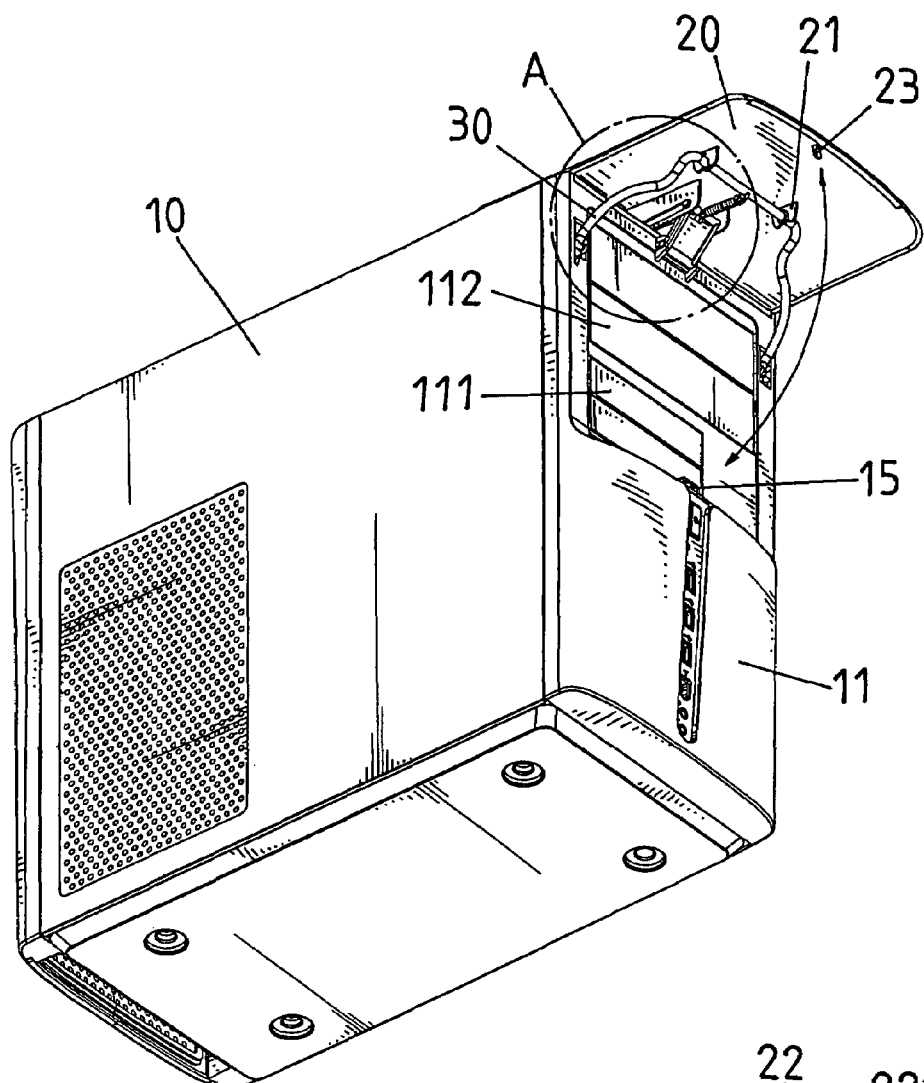
FIG.2
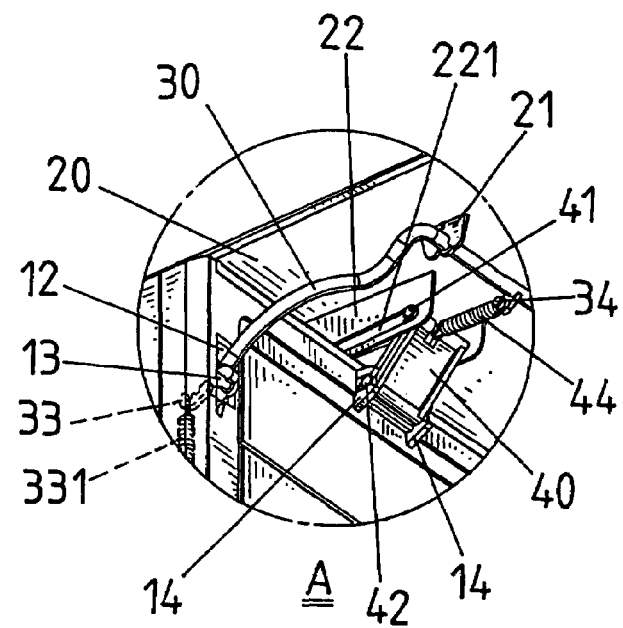
FIG.2~1

MOVABLE COVER-PLATE OF A COMPUTER HOST

BACKGROUND OF THE INVENTION a) Field of the Invention

The present invention relates to a movable cover-plate of a computer host, and more particularly to a cover-plate which is installed on a front panel of computer host to cover a slot of hard disk driver and a slot of CD-ROM disk driver in normal times, and to be opened by being pressed down, when being used.

b) Description of the Prior Art

A front panel of conventional computer host is installed with a slot of hard disk driver and a slot of CD-ROM disk driver which are exposed outside in normal times, and hence are easy to be stained by dusts and are not beautiful in an entire appearance.

SUMMARY OF THE INVENTION

Accordingly, the primary object of the present invention is to provide a movable cover-plate which is installed on a front panel of computer host to cover a slot of hard disk driver and a slot of CD-ROM disk driver on the front panel in normal times for preventing from being stained by dusts or from being damaged by collision, and to be opened by being pressed down, when being used. In addition, the cover-plate can even more beautify an entire appearance of the computer host.

To enable a further understanding of the said objectives and the technological methods of the invention herein, the brief description of the drawings below is followed by the detailed description of the preferred embodiments.

BRIEF DESCRIPTION OF THE DRAWINGS

FIG. 2 shows a schematic view of an appearance of the present invention when a cover-plate is lifted to open.

FIG. 2-1 shows a local enlarged view of the encircled portion A in FIG. 2 of the present invention.

DETAILED DESCRIPTION OF THE PREFERRED EMBODIMENTS

Figure 1:
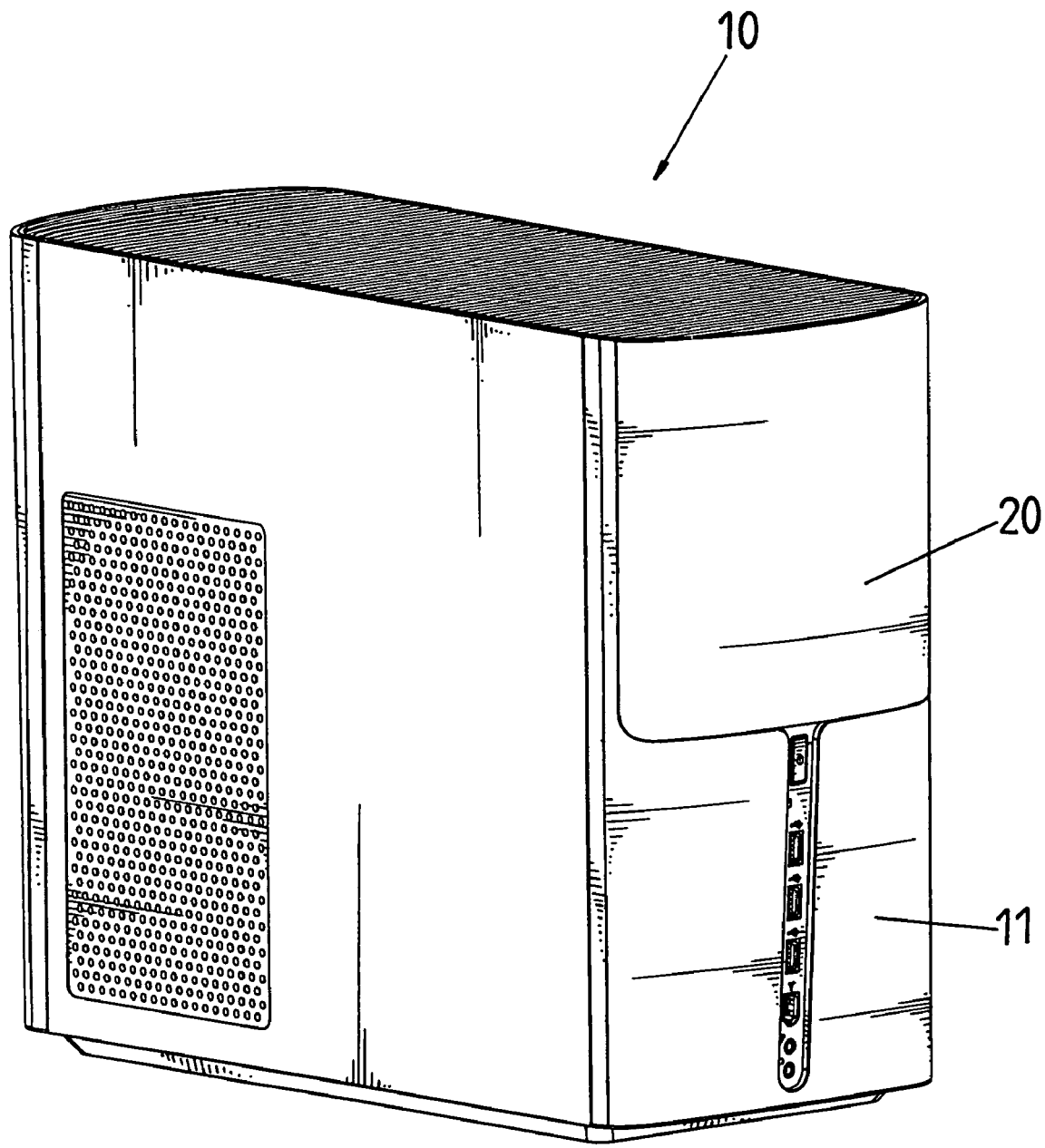
FIG. 1 shows a schematic view of an appearance of the present invention.

Referring to FIG. 1, a front panel 11 of computer host 10 of the present invention is installed with a movable cover-plate 20 which is used to cover a slot of hard disk driver and a slot of CD-ROM disk driver.

Figure 4:
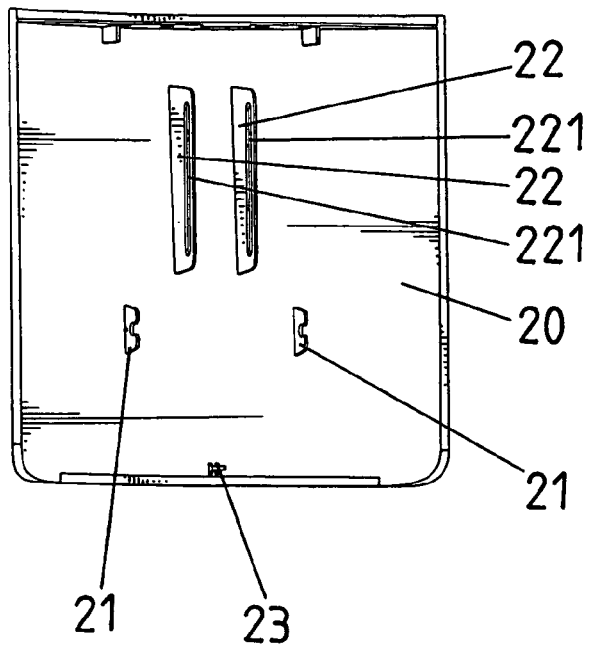
FIG. 4 shows a top view of a cover-plate of the present invention.
Figure 5:
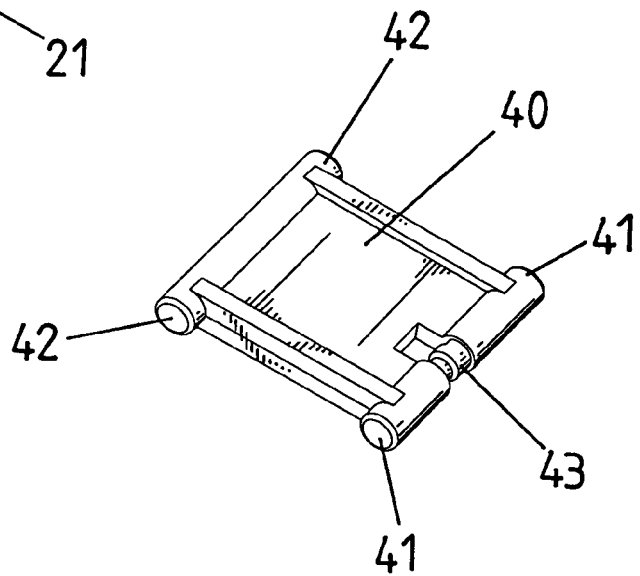
FIG. 5 shows a structural diagram of a movable plate of the present invention.
Figure 3:
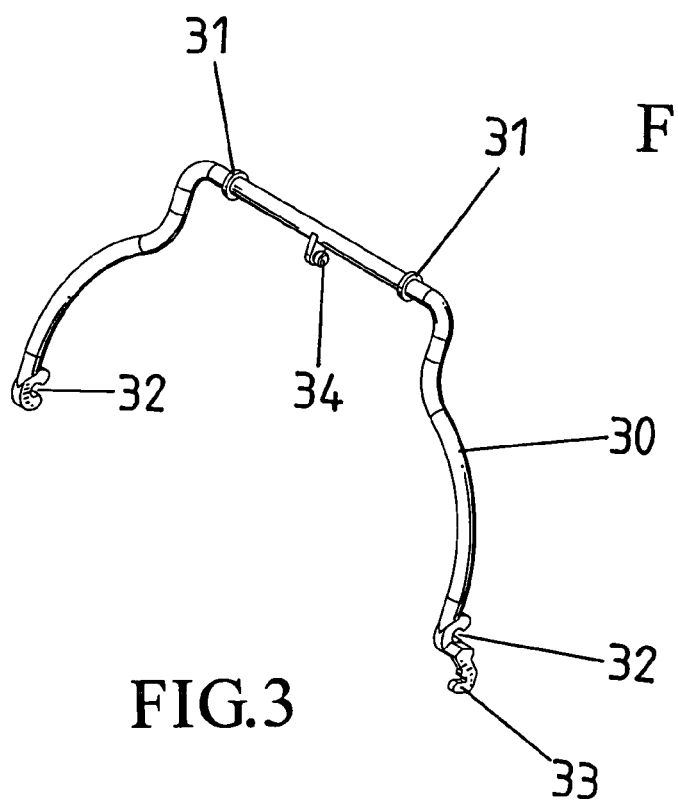
FIG. 3 shows a structural diagram of a hook rod of the present invention.
Figure 6:
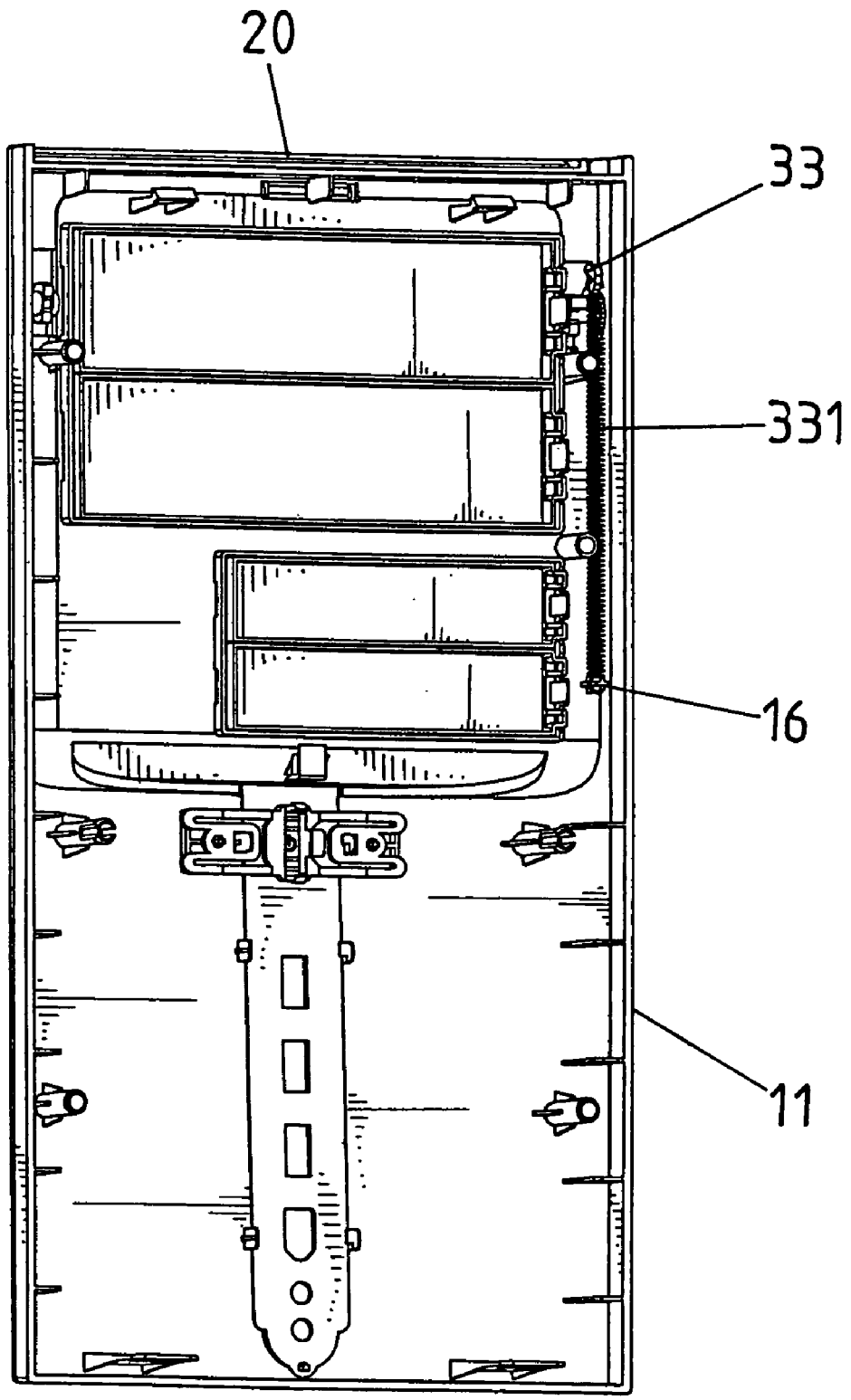
FIG. 6 shows a back view of a front panel of the present invention.

Referring to FIGS. 2 and 2-1, a user can press at a center of bottom part of the cover-plate 20 to automatically open the cover-plate 20, so as to expose out the slot of hard disk driver 111 and the slot of CD-ROM disk driver 112 to be used by the user. A lifting device of the cover-plate 20 is composed of a shaft rod 13 which is transversally emplaced in concaved holes 12 at two sides of a top end of the front panel 11, two C-shape lock seats 14 which are located at a center of top end of the front panel 11, a triangular and plastic hook fastener 15 which is located at a center of bottom part of the front panel 11, and two C-shape lock seats 21 which are located at a center of inner side of the cover-plate 20 and are locked on a lock ring 31 of a curve-shape hook rod 30. As shown in FIG. 3, C-shape fasteners 32 at two sides of the hook rod 30 are latched on the shaft rod 13 of front panel 11 respectively; wherein a bottom end of one C-shape fastener 32 is provided with a barb 33 to hook an elastic member 331. A bottom end of the elastic member 331 is hooked on a hanger 16 at an edge of inner side of the front panel 11 (as shown in FIG. 6), and a center of the hook rod 30 is provided with a spring seat 34. Referring to FIG. 4, an inner side of the cover-plate 20 is provided with a rail constituted by two parallel plates 22, and interiors of which are installed with sliding grooves 221, respectively. Referring to FIG. 5, bumps 41 at two sides of a movable plate 40 are emplaced in the sliding grooves 221 and can be moved in the sliding grooves 221, respectively, along with a movement of the movable plate 40. Two bumps 42 at the other end of moveable plate 40 are pivoted in the lock seat 14 of front panel 11, and a sheath shaft 43 at a center of one end of the movable plate 40 is sheathed with a spring 44, and the other end of which is hooked on the spring seat 34 of hook rod 30. In addition, a center of inner side of the cover-plate 20 is provided with a triangular hook 23 which can be locked in the hook fastener 15 of front panel 11.

Figure 7:
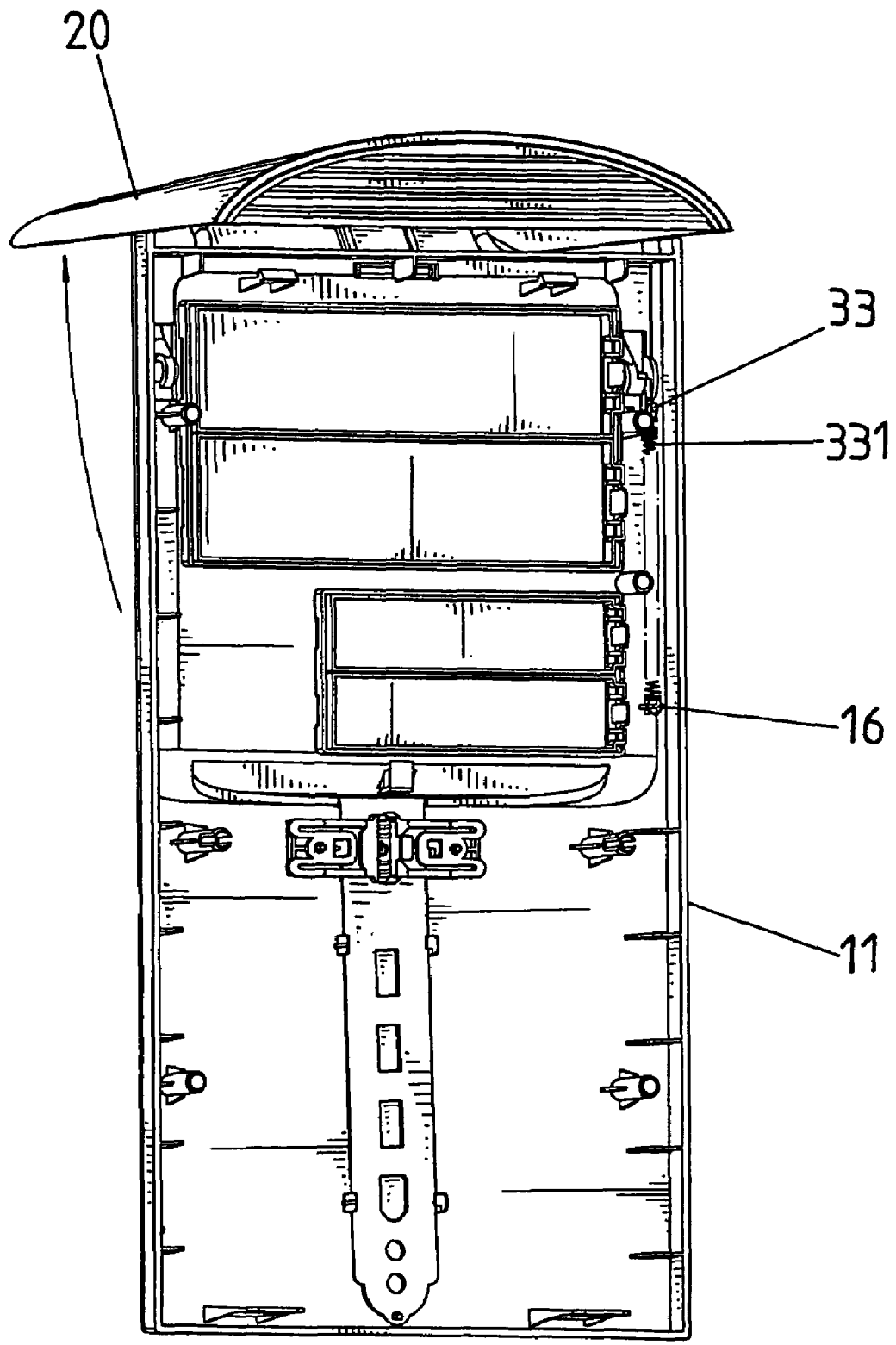
FIG. 7 shows a back view of an action of a front panel of the present invention.

Referring to FIGS. 1 and 6, as the hook 23 of cover-plate 20 is locked in the hook fastener 15 of front panel 11, when the cover-plate 20 is gently pressed by a hand, the hook 23 will be escaped from a locking of the plastic hook fastener 15, and the hook rod 30 will be extended upward with the shaft rod 13 as its center, driven by a restoring force of the elastic member 331 (as shown in FIG. 7). In the mean time, the movable plate 40 is also extended upward with the bumps 41 as its center, driven by a restoring force of the spring 44; whereas other bumps 42 of the movable plate 40 are sliding in the sliding grooves 221 to lift up the cover-plate 20 (as shown in FIG. 2). Upon closing the cover-plate 20, the cover-plate 20 is only pressed down by a hand to extend the elastic member 331 and the spring 44 at the same time; whereas the hook 23 is locked in the hook fastener 15, thereby forming a closed status as shown in FIG. 1.

Accordingly, the present invention is to install a cover-plate on a front panel of computer host, which covers a slot of hard disk driver and a slot of CD-ROM disk driver in normal times, and is lifted up by pressing to open the slots of hard disk driver and CD-ROM disk driver, when being used.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A movable cover-plate of a computer host, wherein the computer host includes a front panel, a front end of which is provided with a slot of hard disk driver and a slot of CD-ROM disk driver, concaved holes at two sides of which are provided with a shaft rod, a center of a top end of which is provided with a lock seat, a center of a bottom part of which is provided with a hook fastener, and an edge of inner side of which is provided with a hanger; a cover-plate, a center of inner side of which is provided with a lock seat, and two plates containing sliding grooves, and a center of inner side of which is provided with a hook to be locked in the hook fastener of front panel; a hook rod, on which is provided with a lock ring for locking the lock seat of cover-plate, and two ends of which are provided with C-shape fasteners to be locked on the shaft rod of front panel respectively, with a bottom part of one C-shape fastener having a barb to hook an elastic member; a bottom end of the elastic member being hooked on the hanger of front panel and a center of which being provided with a spring seat; and a movable plate, a front and rear ends of which are provided with two bumps respectively, with two bumps at the front end being emplaced and moved in the sliding grooves of plates of cover-plate, two bumps at the rear end being pivoted in the lock seat of front panel, and two bumps at the front end being provided with a sheath shaft on which is sheathed with a spring, with the other end of spring being hooked on the spring seat of hook rod; the movable cover-plate assembled by the aforementioned structures covering the slots of hard disk driver and CD-ROM disk driver of front panel in normal times, and being automatically opened by just being pressed down.

* * * * *